United States Patent
Park et al.

(10) Patent No.: US 9,192,911 B2
(45) Date of Patent: *Nov. 24, 2015

(54) OXYGEN-SELECTIVE ADSORBENT HAVING FAST ADSORPTION RATE AND PREPARATION METHOD THEREOF

(75) Inventors: Jong Ho Park, Daejeon (KR); Kwang Bok Yi, Daejeon (KR); Jong Nam Kim, Daejeon (KR); Hee Tae Beum, Daejeon (KR); Jong Kee Park, Daejeon (KR); Chang Hyun Ko, Daejeon (KR); Sang Sup Han, Daejeon (KR); Soon Haeng Cho, Daejeon (KR); Taesung Jung, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 105 days.

This patent is subject to a terminal disclaimer.

(21) Appl. No.: 13/980,094

(22) PCT Filed: Jan. 26, 2012

(86) PCT No.: PCT/KR2012/000610
§ 371 (c)(1),
(2), (4) Date: Jul. 17, 2013

(87) PCT Pub. No.: WO2012/102554
PCT Pub. Date: Aug. 2, 2012

(65) Prior Publication Data
US 2013/0299737 A1 Nov. 14, 2013

(30) Foreign Application Priority Data
Jan. 26, 2011 (KR) ........................ 10-2011-0007915

(51) Int. Cl.
*C01F 11/18* (2006.01)
*B01J 20/04* (2006.01)
*B01D 53/02* (2006.01)
*C01F 11/06* (2006.01)
*B01J 20/30* (2006.01)

(52) U.S. Cl.
CPC .............. *B01J 20/041* (2013.01); *B01D 53/02* (2013.01); *B01J 20/043* (2013.01); *B01J 20/3078* (2013.01); *C01F 11/06* (2013.01); *C01F 11/18* (2013.01); *B01D 2251/402* (2013.01); *B01D 2251/408* (2013.01); *B01D 2251/602* (2013.01); *B01D 2251/606* (2013.01); *B01D 2253/112* (2013.01); *B01D 2257/104* (2013.01); *B01D 2258/06* (2013.01); *B01J 2220/42* (2013.01); *C01P 2002/72* (2013.01); *C01P 2002/88* (2013.01); *C01P 2004/03* (2013.01)

(58) Field of Classification Search
CPC ..................................................... C01F 11/188
See application file for complete search history.

(56) References Cited

U.S. PATENT DOCUMENTS 3,324,654 A * 6/1967 Squires ........................... 60/781
5,135,548 A     8/1992 Golden et al.
5,478,543 A    12/1995 Murota et al.
5,536,302 A     7/1996 Golden et al.

FOREIGN PATENT DOCUMENTS

JP     10-085589 A    4/1998

OTHER PUBLICATIONS

Smykatz-Kloss, W. "Differential Thermal Analysis: Application and Results in Mineralogy" (1974).*
Bottcher et al. "The vibrational spectra of BaMg(CO3)2 (norsethite)" Mineralogical Magazine, Apr. 1997, vol. 61, pp. 249-256.*

* cited by examiner

*Primary Examiner* — Peter F Godenschwager
(74) *Attorney, Agent, or Firm* — Sughrue Mion, PLLC

(57) ABSTRACT

Provided is a preparation method of an oxygen-selective adsorbent selectively adsorbing oxygen in the air and an oxygen-selective adsorbent prepared thereby. The preparation method includes: preparing $BaMg(CO_3)_2$ particles or particles in which $MgCO_3$ or $Mg(OH)_2$ are attached to the outside of $BaMg(CO_3)_2$; and sintering the particles at a high temperature. The oxygen-selective adsorbent according to the present invention may adsorb oxygen in the air at a fast rate as compared with an existing oxygen-selective adsorbent and have high thermal stability and excellent oxygen adsorptivity.

10 Claims, 5 Drawing Sheets

OXYGEN-SELECTIVE ADSORBENT HAVING FAST ADSORPTION RATE AND PREPARATION METHOD THEREOF

CROSS REFERENCE TO RELATED APPLICATIONS

This is a National Stage of International Application No. PCT/KR2012/000610, filed Jan. 26, 2012, claiming priority based on Korean Patent Application No. 10-2011-0007915, filed Jan. 26, 2011, the contents of all of which are incorporated herein by reference in their entirety.

TECHNICAL FIELD

The present invention relates to an oxygen-selective adsorbent capable of adsorbing oxygen in the air at a fast rate to produce high-purity oxygen and a preparation method thereof, and more particularly, to an oxygen-selective adsorbent prepared by sintering $BaMg(CO_3)_2$ particles or particles in which $MgCO_3$ or $Mg(OH)_2$ are attached to the outside of $BaMg(CO_3)_2$ at a high temperature, and a preparation method thereof.

BACKGROUND ART

Barium oxide has been well known as a material that reacts with oxygen to thereby be converted into barium peroxide through an oxidation reaction shown in Chemical Formula 1, adsorbing oxygen during this process, and releasing oxygen through a reduction reaction under oxygen-free atmosphere. Due to these properties of barium oxide, barium oxide has been used in a process of producing oxygen in the early 20$^{th}$ century.

$$BaO + \frac{1}{2}O_2 \rightarrow BaO_2 \quad \text{[Chemical Formula 1]}$$

However, since barium peroxide does not have thermal stability at a high temperature, barium peroxide tends to lose oxygen adsorptivity while a cycle progresses. In more detail, barium peroxide is a significantly thermally unstable material, such that a sintering phenomenon between particles thereof may be generated at a high temperature. Therefore, a size of the particle may be increased, and oxygen adsorptivity may be gradually lost as a process progresses. In order to prepare oxygen-selective adsorbent capable of maintaining adsorptivity, this phenomenon should be blocked. In addition, since barium peroxide easily reacts with another mineral or metal component due to excellent reactivity to thereby lose a binding property with oxygen, there is a need for making a structure capable of stably protecting a barium component (barium oxide) selectively adsorbing oxygen.

Various methods for solving this problem have been attempted, and among them, a method of fixing barium oxide to dolomite to increase a use-rate and reactivity has been disclosed in U.S. Pat. Nos. 3,773,680 and 3,903,010. In the method disclosed in U.S. Pat. Nos. 3,773,680 and 3,903,010, an oxygen-selective adsorbent was prepared by simply mixing barium oxide and a solid dolomite with each other to be used to produce forming method to pellet with high pressure.

It is disclosed in U.S. Pat. No. 4,092,264 that an oxygen adsorbent capable of increasing a use-rate of barium and having improved stability may be prepared by impregnating barium oxide with zirconia. A method of impregnating barium oxide disclosed in U.S. Pat. No. 4,092,264 is as follows. First, porous zirconia is fired at a high temperature to remove impurities, mixed with barium peroxide, and then the obtained mixture is heated to allow barium peroxide to be impregnated with zirconia. According to the patent, in the case of impregnating barium peroxide with zirconia by the above-mentioned method, thermal stability may be increased, and heat generated in an oxidation reaction with oxygen at the time of performing an oxygen producing process may be effectively stored and used at the time of performing a reduction process, such that efficiency of the process may be increased. Here, when barium is impregnated with zirconia at a level of 20% or less, stability may be maximally implemented, and the use-rate of barium may be increased.

According to the patents, a method of mixing or impregnating barium peroxide with a third substrate mainly in a dried state has been used. However, in the case of using the method of mixing barium peroxide with the third substrate, a non-uniform protective film is formed, such that a use-rate of barium oxide may not be high, and in the case of impregnating barium peroxide with the third substrate, since a material acting as the substrate is required in excessive amounts, it may be impossible to develop a material having high oxygen adsorptivity.

As another method, after barium oxide and a precursor of magnesium oxide (aqueous magnesium salt) are appropriately mixed in an aqueous solution, barium oxide may be captured in a framework of magnesium oxide by inducing evaporation of water to form precipitates and being subjected to a sintering process at a high temperature. However, in this method, barium oxide reacts with water during the sintering process to form barium hydroxide, which has low stability and high reactivity, such that it is not easy to perform the sintering process, and oxygen adsorptivity may be decreased after sintering.

DISCLOSURE

Technical Problem

An object of the present invention is to provide an oxygen-selective adsorbent capable of adsorbing oxygen in the air at a fast rate as compared with an existing oxygen-selective adsorbent and having high thermal stability and excellent oxygen adsorptivity, and a preparation method thereof.

Technical Solution

The present inventors studied on an oxygen-selective adsorbent and found that in the case of sintering $BaMg(CO_3)_2$ particles or particles in which $MgCO_3$ or $Mg(OH)_2$ are attached to the outside of $BaMg(CO_3)_2$ at a high temperature, as $BaCO_3$ and $MgCO_3$ in $BaMg(CO_3)_2$ are converted into barium oxide and magnesium oxide, respectively, barium oxide and magnesium oxide having a nano-size are formed and an oxygen adsorption rate is increased, thereby completing the present invention.

In one general aspect, a preparation method of an oxygen-selective adsorbent selectively adsorbing oxygen in the air, the preparation method includes: preparing $BaMg(CO_3)_2$ particles or particles in which $MgCO_3$ or $Mg(OH)_2$ are attached to the outside of $BaMg(CO_3)_2$; and burning the particles at a high temperature.

Hereinafter, the preparation method of an oxygen-selective adsorbent according to the present invention will be described in detail.

First, the $BaMg(CO_3)_2$ particles or particles in which $MgCO_3$ or $Mg(OH)_2$ are attached to the outside of $BaMg(CO_3)_2$ may be prepared.

$BaMg(CO_3)_2$, which is a solid solution of $BaCO_3$ and $MgCO_3$, is discovered in natural minerals and referred to as norsethite. As a synthetic method of this material, there are various methods. For example, a method of mixing $BaCO_3$ and $MgCO_3$ particles at a high temperature and sintering the mixture at 500° C. or more to prepare this material, a method of synthesizing $BaCO_3$ in an aqueous solution of $MgCl_2$ and $NaHCO_3$, a method of using $MgCO_3.3H_2O$ instead of $MgCl_2$ as a source of Me in the synthetic method in the aqueous solution, a method of adding $CO_3^{2-}$ in an aqueous solution in which $Ba^{2+}$ and $Mg^{2+}$ are present, and the like, have been known.

According to the embodiment of the present invention, the $BaMg(CO_3)_2$ particles may be prepared by dispersing a mixture of a compound containing barium and carbonate in distilled water and adding a magnesium carbonate precursor thereto or prepared by another method.

According to the embodiment of the present invention, the particles in which $MgCO_3$ or $Mg(OH)_2$ are attached to the outside of $BaMg(CO_3)_2$ may be prepared by dispersing a mixture of a compound containing barium and carbonate in distilled water, adding a magnesium carbonate precursor to prepare particles, filtering and washing the prepared particles to disperse the resultants in distilled water again, adding the magnesium carbonate precursor thereto, performing ultrasonic treatment, and then adding aqueous ammonia water, or prepared by another method.

$MgCO_3$ or $Mg(OH)_2$ in the particles in which $MgCO_3$ or $Mg(OH)_2$ are attached to the outside of $BaMg(CO_3)_2$ may be preferably attached to the outside of $BaMg(CO_3)_2$ at a molar ratio of 1 to 10 based on $BaMg(CO_3)_2$.

In the case of sintering the particles in which $MgCO_3$ or $Mg(OH)_2$ are attached to the outside of $BaMg(CO_3)_2$ at a high temperature to prepare the oxygen-selective adsorbent, the oxygen-selective adsorbent having excellent thermal stability may be obtained.

According to the embodiment of the present invention, the compound containing barium may be $BaCO_3$ or $BaCl_2$, but is not limited thereto.

According to the embodiment of the present invention, as the carbonate mixed with the compound containing barium, carbonate containing a $CO_3^{2-}$ source such as $Na_2CO_3$, or the like, may be used without limitation.

According to the embodiment of the present invention, the magnesium carbonate precursor may be $Mg(NO_3)_2.6H_2O$ or $MgCO_3.3H_2O$, but is not necessarily limited thereto.

Next, the prepared $BaMg(CO_3)_2$ particles or the particles in which $MgCO_3$ or $Mg(OH)_2$ are attached to the outside of $BaMg(CO_3)_2$ may be fired at a high temperature.

According to the embodiment of the present invention, the particles in which $MgCO_3$ or $Mg(OH)_2$ are attached to the outside of $BaMg(CO_3)_2$ may be fired at 700-800° C. under hydrogen atmosphere or at 900 to 1200° C. under oxygen atmosphere.

As described above, in the case of sintering the $BaMg(CO_3)_2$ particles or the particles in which $MgCO_3$ or $Mg(OH)_2$ are attached to the outside of $BaMg(CO_3)_2$, $MgCO_3$ existing in $BaMg(CO_3)_2$ may be easily oxidized at 500° C. or less to thereby be converted into magnesium oxide, but $BaCO_3$ may be converted into barium oxide only at 900° C. or more under oxygen atmosphere or at 800° C. or less under hydrogen atmosphere.

In another general aspect, there is provided an oxygen-selective adsorbent prepared by the preparation method as described above.

Advantageous Effects

According to the present invention, an oxygen-selective adsorbent capable of adsorbing oxygen in the air at a fast rate and having high thermal stability and excellent oxygen adsorptivity, and a preparation method thereof may be provided.

BEST MODE

Figure 1:
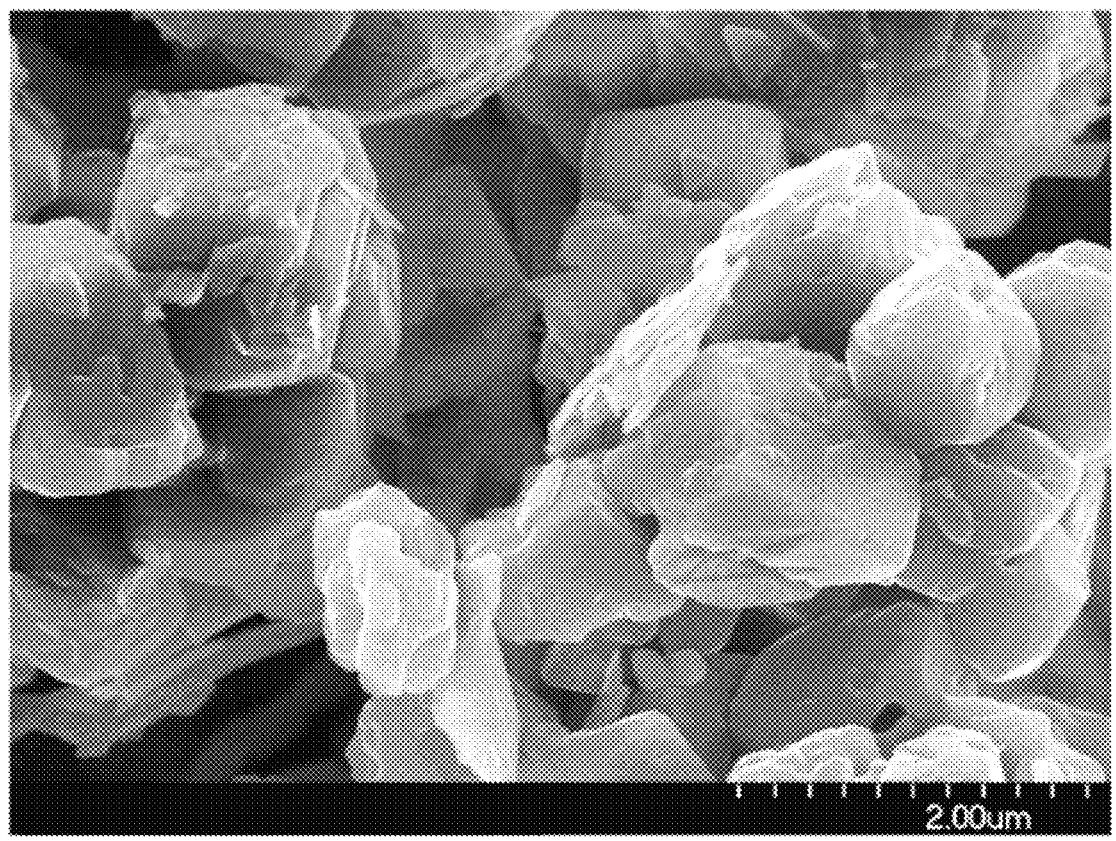
FIG. 1 is a scanning electronic microscope (SEM) photograph of an oxygen-selective adsorbent prepared in Example 1 of the present invention.

Hereinafter, even though preferable Examples will be provided for assisting in understanding of the present invention, but the following Examples are to illustrate the present invention. Therefore, those skilled in the art will appreciate that various modifications and alterations are possible within the scope and spirit of the invention, and such modifications and alterations should also be understood to fall within the scope of the present invention.

EXAMPLE

Example 1

After a mixture of 8 g of $BaCO_3$ and 8 g of $Na_2CO_3$ was dispersed in 200 cc of distilled water, a solution in which magnesium nitrate ($Mg(NO_3)_2.6H_2O$, 20 g) was dissolved in 100 cc of distilled water was slowly added thereto, thereby preparing particles (a molar ratio of Ba:Mg was 0.5:1). In this case, a solution in which $BaCO_3$ and $Na_2CO_3$ were dissolved was maintained at 90° C. Thereafter, the obtained $BaMg(CO_3)_2$ particles were collected through a filtering and washing process. Next, a SEM photograph of the collected particles was photographed and shown in FIG. 1, and an XRD pattern thereof was measured and shown in FIG. 3. The obtained particles were fired in an electric furnace at 900° C. under oxygen atmosphere for 10 hours, thereby preparing an oxygen-selective adsorbent according to the present invention.

Example 2

After a mixture of 8 g of $BaCO_3$ and 4 g of $Na_2CO_3$ was dispersed in 200 cc of distilled water, a solution in which magnesium nitrate ($Mg(NO_3)_2 \cdot 6H_2O$, 10 g) was dissolved in 100 cc of distilled water was slowly added thereto, thereby preparing particles (a molar ratio of Ba:Mg was 1:1). In this case, a solution in which $BaCO_3$ and $Na_2CO_3$ were dissolved was maintained at 90° C. Then, the obtained particles were filtered and washed. 5 g of the particles obtained through this process was dispersed in distilled water (100 cc), and then 10 g of magnesium nitrate was dissolved in this solution and subjected to ultrasonic treatment. Aqueous ammonia was slowly added to the solution subjected to the ultrasonic treatment to form $Mg(OH)_2$ coated on $BaMg(CO_3)_2$. Then, a SEM photograph thereof was photographed and shown in FIG. 2, and an XRD pattern thereof was measured and shown in FIG. 4. The obtained particles were fired in an electric furnace at 900° C. under oxygen atmosphere for 10 hours, thereby preparing an oxygen-selective adsorbent according to the present invention.

Comparative Example 1

A predetermined amount of barium peroxide, which is a barium precursor, was uniformly dispersed in a solution in which 30 cc of a magnesium methoxide solution (6 to 10 wt. %) and 20 cc of methanol were mixed with each other, and then a small amount of distilled water was slowly added thereto. Thereafter, water was added thereto to perform gelation of the solution. This gel was dried at 40° C. for 3 hours, methanol was removed therefrom at 80° C., and sintering was performed at 900° C., thereby obtaining a final oxygen adsorbent.

Experimental Example 1

Observation of Scanning Electronic Microscope (SEM) Photograph

Figure 2:
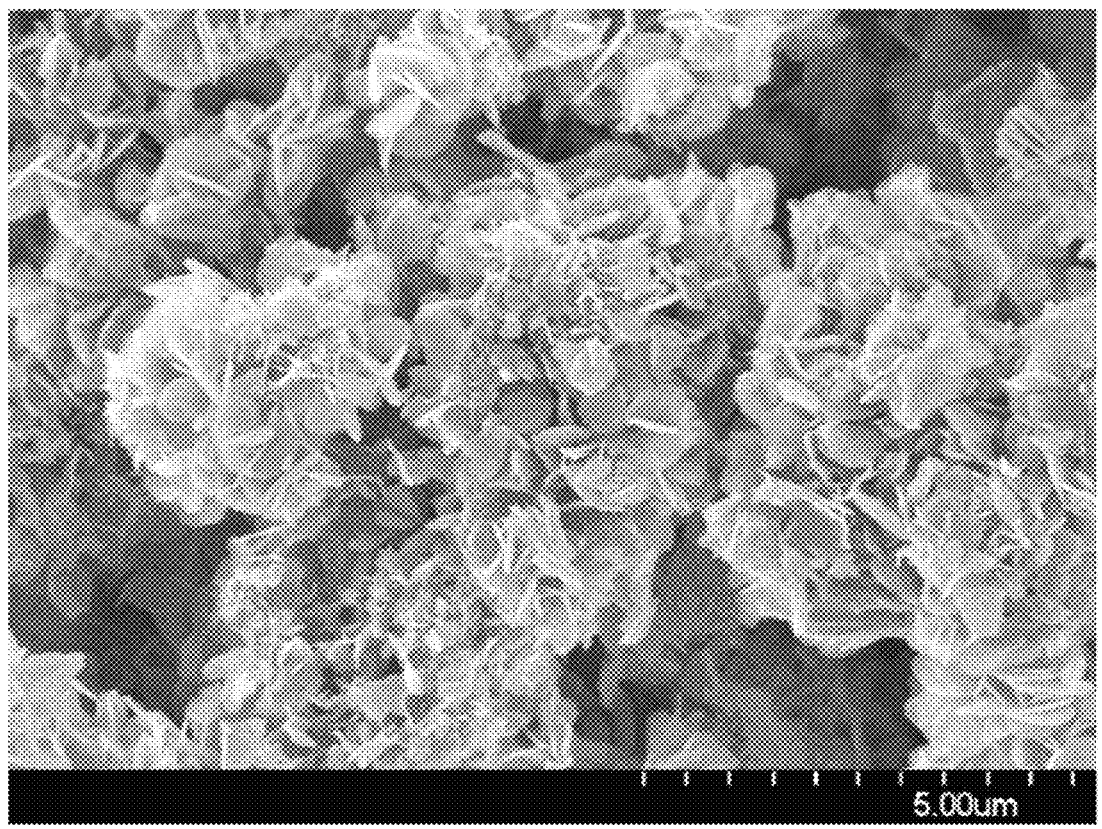
FIG. 2 is a scanning electronic microscope (SEM) photograph of an oxygen-selective adsorbent prepared in Example 2 of the present invention.

FIGS. 1 and 2 are the SEM photographs of the oxygen-selective adsorbents prepared in Examples 1 and 2, respectively. Referring to FIG. 1, it may be appreciated that $BaMg(CO_3)_2$ particles having an angled rectangular shape were prepared in Example 1, and referring to FIG. 2, it may be appreciated that particles having a shape in which flake $Mg(OH)_2$ was attached to $BaMg(CO_3)_2$ so as to enclose $BaMg(CO_3)_2$ were prepared. It was observed that sizes of the $BaMg(CO_3)_2$ particles or the particles in which $Mg(OH)_2$ are attached to the outside of $BaMg(CO_3)_2$ prepared in Examples 1 and 2, respectively, were about 1 to 5 microns.

Experimental Example 2

X-Ray Diffraction Analysis

Figure 3:
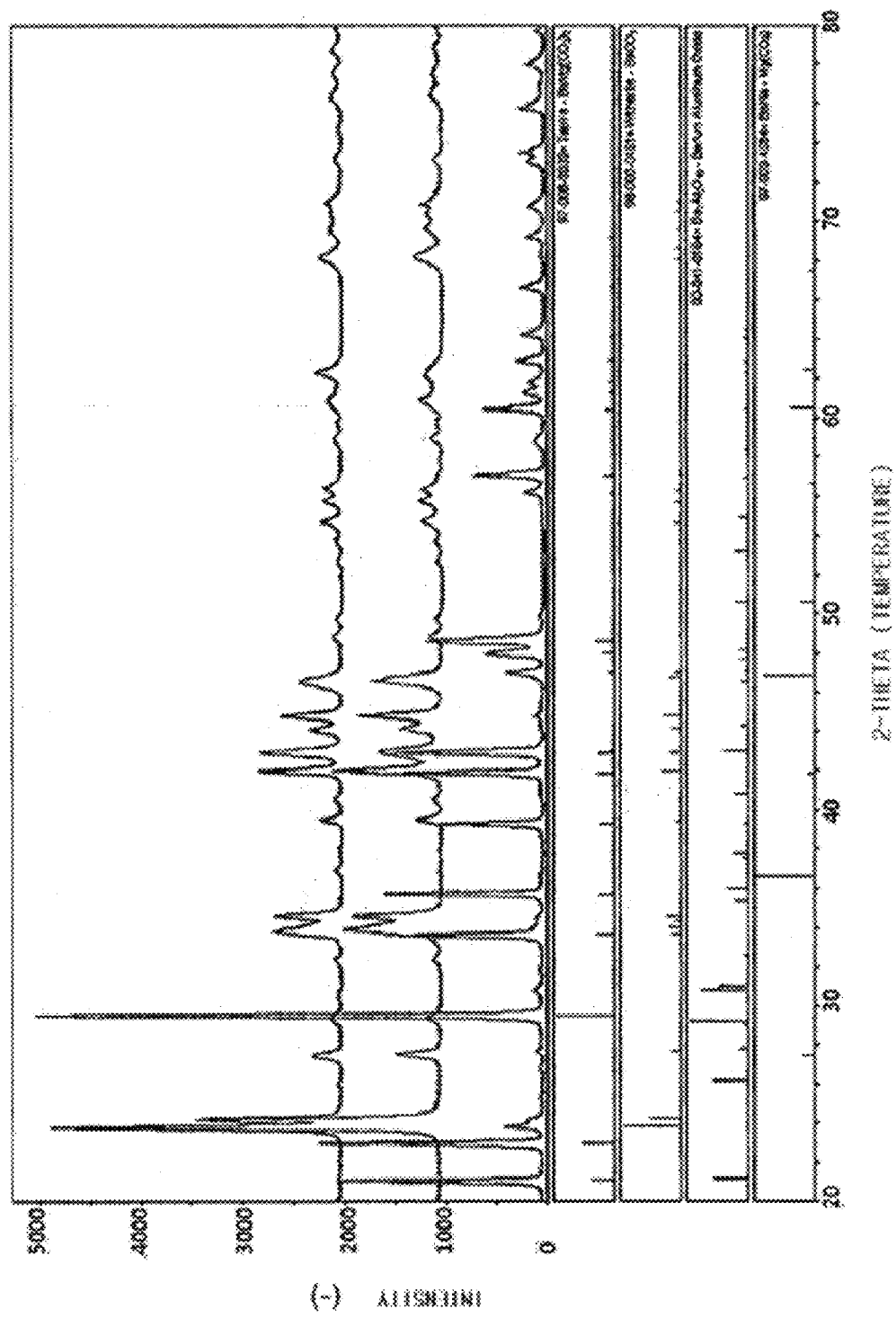
FIG. 3 is an x-ray diffraction (XRD) pattern of the oxygen-selective adsorbent prepared in Example 1 of the present invention.
Figure 4:
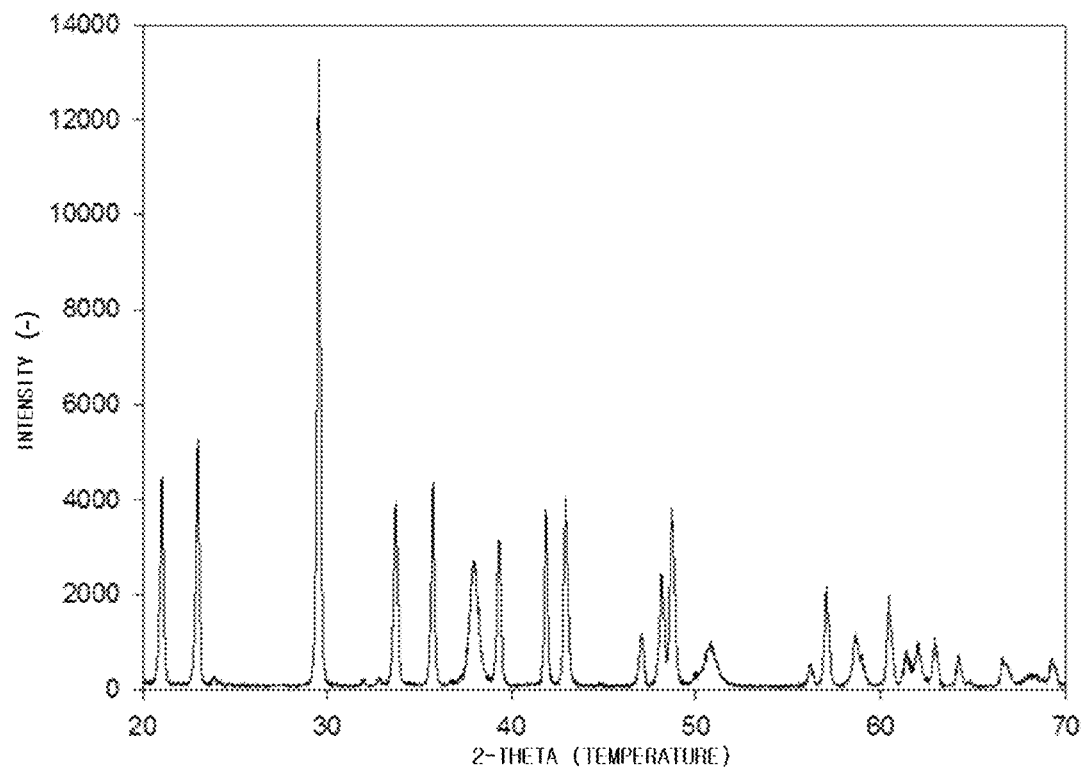
FIG. 4 is an x-ray diffraction (XRD) pattern of the oxygen-selective adsorbent prepared in Example 2 of the present invention.

FIGS. 3 and 4 show the results obtained by performing X-ray diffraction analysis on the oxygen-selective adsorbents prepared in Examples 1 and 2, respectively. Results obtained by sintering the $BaMg(CO_3)_2$ particles prepared in Example 1 at a high temperature of 500° C. or 700° C., and performing the X-ray diffraction analysis, respectively, were also shown In FIG. 3. Referring to FIG. 3, characteristic peaks of a $BaMg(CO_3)_2$ crystal were observed at 21° C., 22° C., and 29.5° C., and the like. This crystal was fired at 500° C. or 700° C., the peak of the $BaMg(CO_3)_2$ crystal disappeared, and a peak of $BaCO_3$ was observed. FIG. 4 shows the XRD peak of the adsorbent prepared in Example 2, and it may be observed that the $BaMg(CO_3)_2$ crystal was formed in Example 2.

Experimental Example 3

Figure 5:
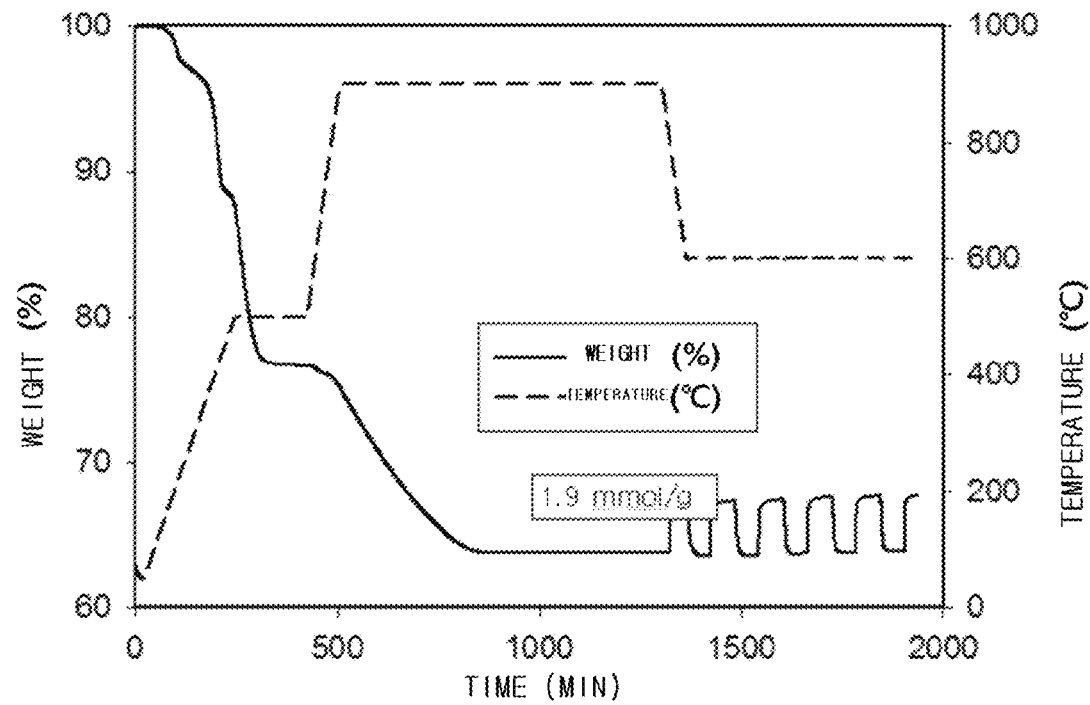
FIG. 5 is a graph showing results obtained by performing oxygen adsorption and desorption on the oxygen-selective adsorbent prepared in Example 1 of the present invention.

Experiment of Long-Term Adsorption/Desorption Characteristics of Oxygen-Selective Adsorbent FIG. 5 shows results obtained by observing oxygen adsorption and desorption characteristics of the oxygen-selective adsorbent prepared in Example 1 using thermal gravimetric analysis (TGA). After the particles prepared in Example 1 were loaded on a TGA sample loader, a temperature was raised to 500° C. under oxygen atmosphere and then maintained for 3 hours. During this process, as $MgCO_3$ in $BaMg(CO_3)_2$ was converted into $MgO$, a weight was decreased, and $BaCO_3$ was present in the crystal. When a temperature of the prepared sample was raised again to 900° C., $BaCO_3$ was converted into $BaO$. When this sample was cooled to 600° C. under oxygen atmosphere, oxygen was adsorbed to increase the weight, and when the atmosphere was changed to helium atmosphere after saturated adsorption, oxygen was desorbed. FIG. 5 show results obtained by measuring the oxygen adsorption and desorption characteristics while repeating oxygen injection-helium injection. It may be appreciated that an oxygen adsorption amount was significantly stably maintained. The oxygen adsorption amount measured in the present Experimental Example was 1.9 mmol/g.

Experimental Example 4

Adsorption/Desorption Rate of Oxygen-Selective Adsorbent

Figure 6:
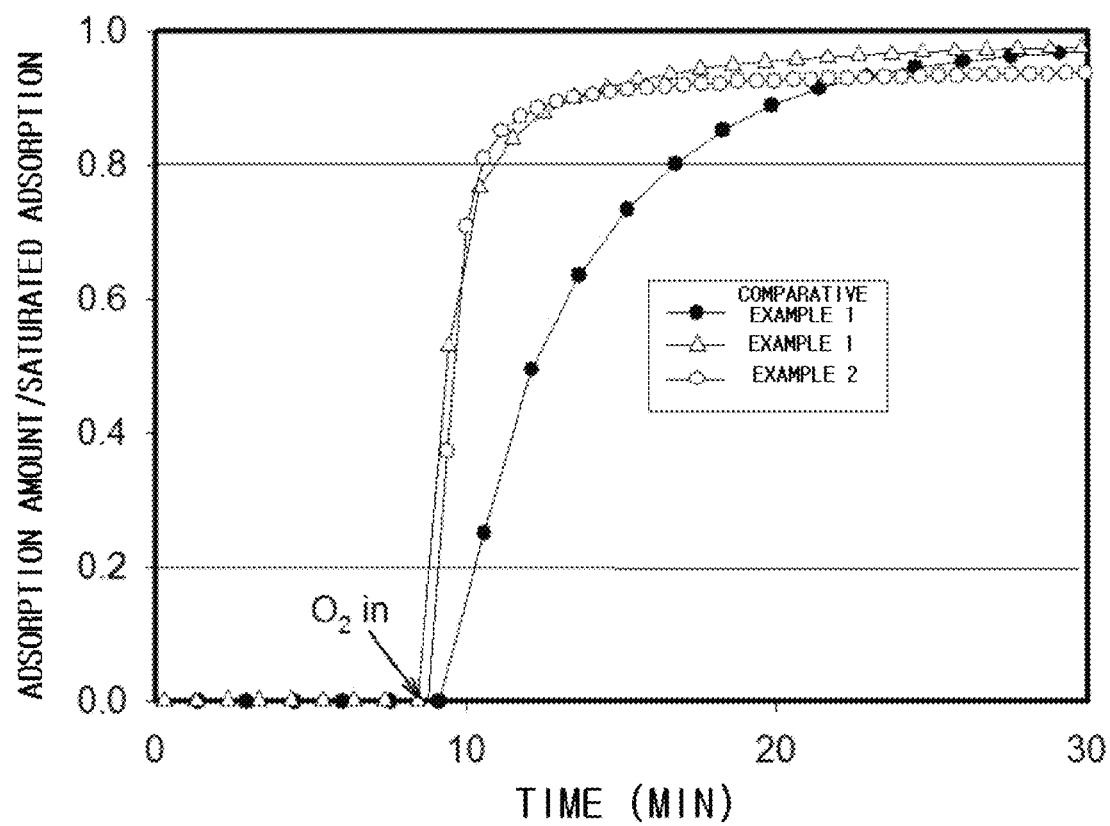
FIG. 6 is a graph comparing adsorption rates of the oxygen-selective adsorbents prepared in Examples 1 and of the present invention and an oxygen-selective adsorbent prepared in Comparative Example 1 with one another.

FIG. 6 shows results obtained by comparing adsorption rates of the oxygen-selective adsorbents prepared in Examples 1 and 2 of the present invention and adsorption and desorption rates of the oxygen-selective adsorbent prepared in Comparative Example 1 with one another. In FIG. 6, an X axis indicates time, and a Y axis indicates a ratio of an absorption amount to a saturated adsorption amount. Comparing times consumed until an amount of adsorbed oxygen was 0.8 of the saturated adsorption amount, it was observed that in Examples 1 and 2, approximately 2 minutes were consumed in adsorbing 80% of the saturated adsorption amount. However, approximately 8 minutes were consumed in the adsorbent prepared in Comparative Example 1. Therefore, it may be appreciated that the adsorbent according to the present invention had a faster adsorption rate.

The invention claimed is:
1. A preparation method of an oxygen-selective adsorbent selectively adsorbing oxygen in the air, the preparation method comprising:
   preparing $BaMg(CO_3)_2$ particles or particles in which $MgCO_3$ or $Mg(OH)_2$ are attached to the outside of $BaMg(CO_3)_2$; and
   sintering the particles at 700 to 800° C. under hydrogen atmosphere.
2. The preparation method of claim 1, wherein in the particles in which $MgCO_3$ or $Mg(OH)_2$ are attached to the outside of $BaMg_{(CO_3)}$) $MgCO_3$ or $Mg(OH)_2$ are attached to the outside of $BaMg(CO_3)_2$ at a molar ratio of 1 to 10 based on $BaMg(CO_3)_2$.
3. The preparation method of claim 1, wherein the $BaMg(CO_3)_2$ particles are prepared by dispersing a mixture of a compound containing barium and carbonate in distilled water and adding a magnesium carbonate precursor thereto.
4. The preparation method of claim 3, wherein the compound containing barium is $BaCO_3$ or $BaCl_2$.

5. The preparation method of claim 3, wherein the carbonate is $Na_2CO_3$.

6. The preparation method of claim 3, wherein the magnesium carbonate precursor is $Mg(NO_3)_2 \cdot 6H_2O$ or $MgCO_3 \cdot 3H_2O$.

7. The preparation method of claim 1, wherein the particles in which $MgCO_3$ or $Mg(OH)_2$ are attached to the outside of $BaMg(CO_3)_2$, are prepared by dispersing a mixture of a compound containing barium and carbonate in distilled water, adding a magnesium carbonate precursor thereto to obtain particles, filtering and washing the obtained particles, dispersing the washed particles in distilled water again, adding the magnesium carbonate precursor thereto, performing a ultrasonic treatment, and then adding aqueous ammonia thereto.

8. The preparation method of claim 7, wherein the compound containing barium is $BaCO_3$ or $BaCl_2$.

9. The preparation method of claim 7, wherein carbonate is $Na_2CO_3$.

10. The preparation method of claim 7, wherein the magnesium carbonate precursor is $Mg(NO_3)_2 \cdot 6H_2O$ or $MgCO_3.3H_2$3$\cdot 3H_2O$.

\* \* \* \* \*